No. 676,781. Patented June 18, 1901.
E. B. STIMPSON.
BEVEL CUTTING AND PUNCHING MACHINE.
(Application filed Feb. 10, 1900.)
(No Model.) 3 Sheets—Sheet 1.
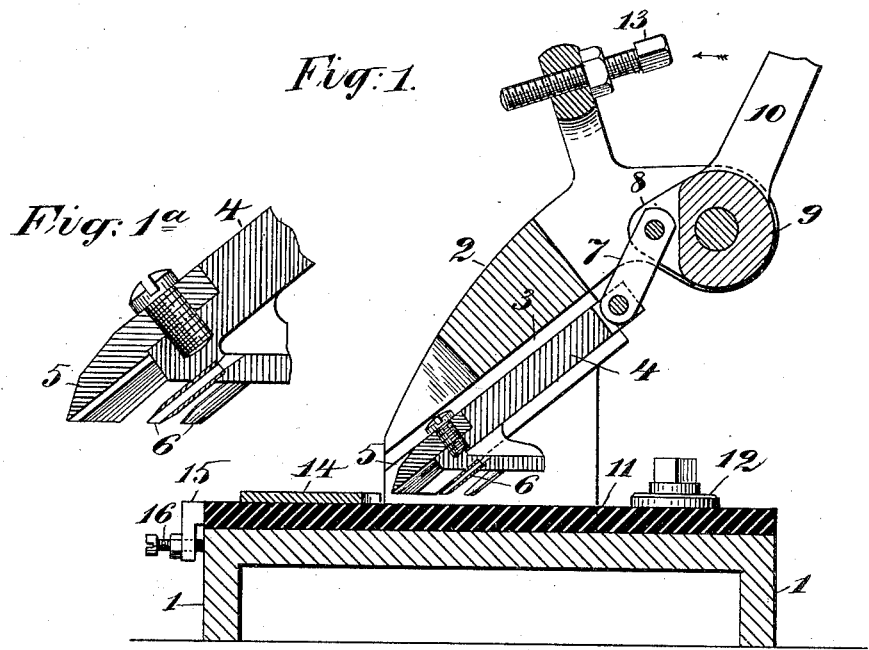
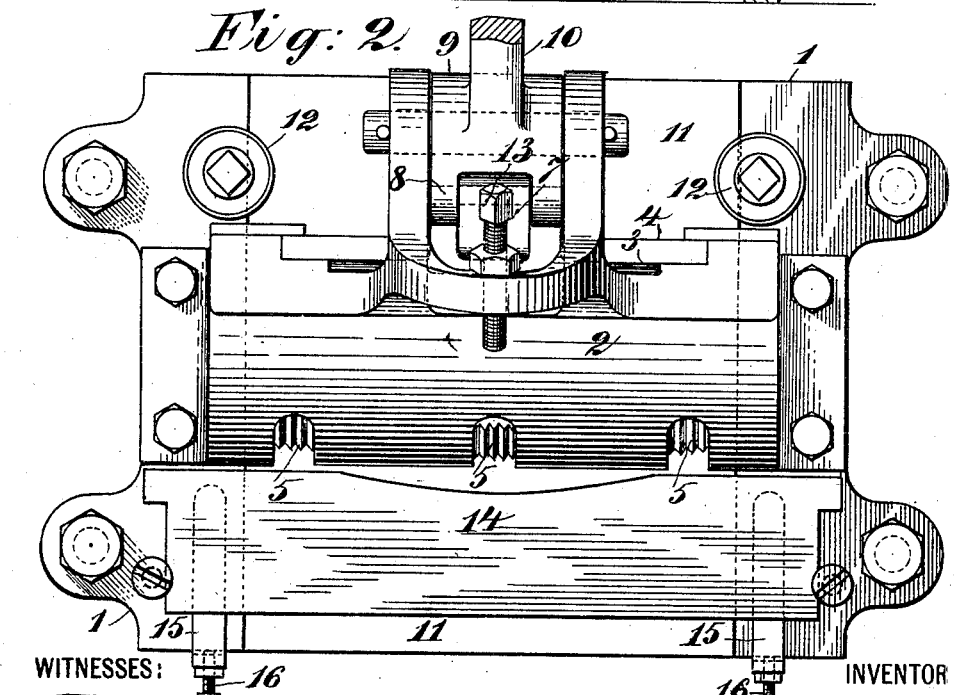

No. 676,781. Patented June 18, 1901.
E. B. STIMPSON.
BEVEL CUTTING AND PUNCHING MACHINE.
(Application filed Feb. 10, 1900.)
(No Model.) 3 Sheets—Sheet 2.
Fig. 3.
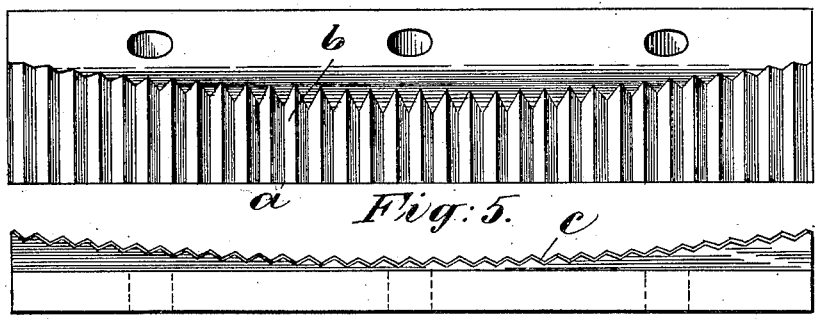
Fig. 4.
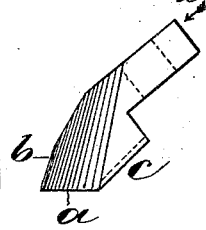
Fig. 5.
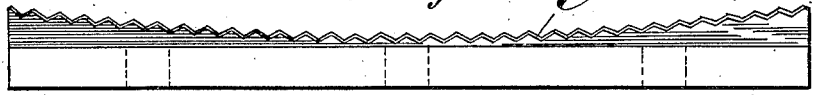
Fig. 6.
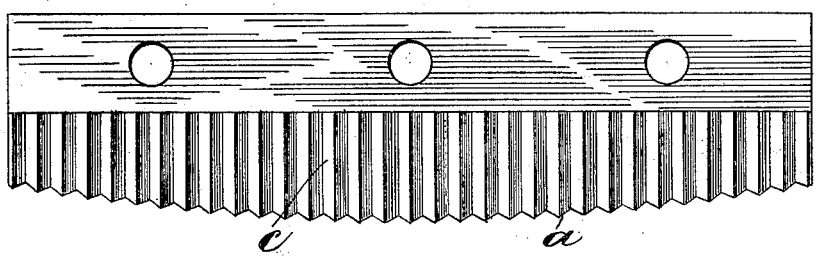
Fig. 7.
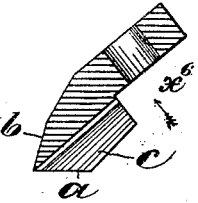
Fig. 8.
Fig. 9.
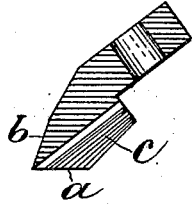
Fig. 10.
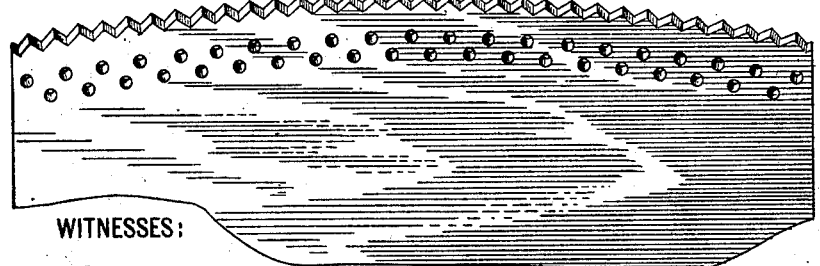
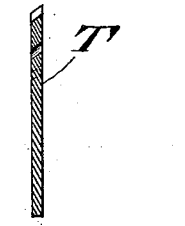
WITNESSES:
J. W. Kliman
Peter A. Ross
INVENTOR
Edwin B. Stimpson
BY
Henry Connett
ATTORNEY No. 676,781. Patented June 18, 1901.
E. B. STIMPSON.
BEVEL CUTTING AND PUNCHING MACHINE.
(Application filed Feb. 10, 1900.)
(No Model.) 3 Sheets—Sheet 3.
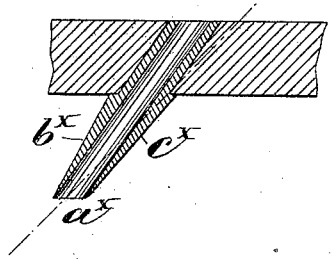
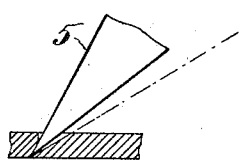
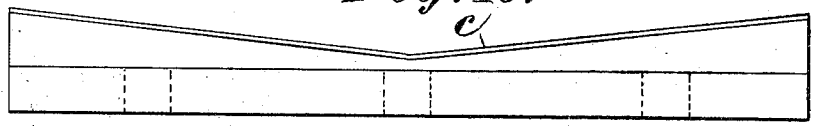
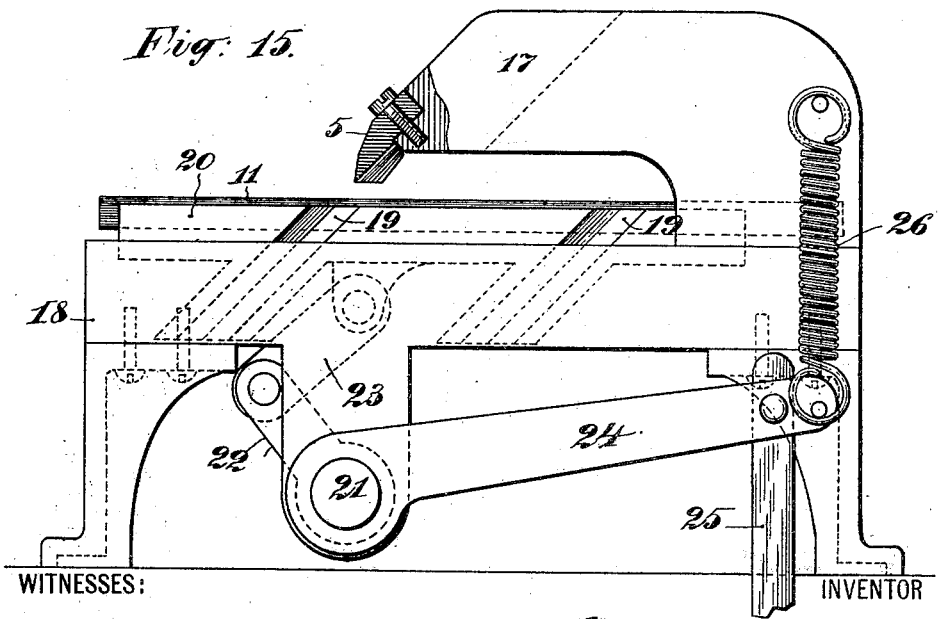
WITNESSES: INVENTOR
F. W. Wiman Edwin B. Stimpson
Peter R. Ross BY
Henry Connett
ATTORNEY

UNITED STATES PATENT OFFICE.

EDWIN B. STIMPSON, OF BROOKLYN, NEW YORK.

BEVEL-CUTTING AND PUNCHING MACHINE.

SPECIFICATION forming part of Letters Patent No. 676,781, dated June 18, 1901.

Application filed February 10, 1900. Serial No. 4,749. (No model.)

*To all whom it may concern:*

Be it known that I, EDWIN B. STIMPSON, a citizen of the United States, residing in the borough of Brooklyn, in the county of Kings and city and State of New York, have invented certain new and useful Improvements in Bevel-Cutting and Punching Devices, of which the following is a specification.

This invention relates to mechanisms for bevel-cutting or punching, or both, and particularly to that class of such mechanisms as are employed for cutting and punching the leather tips for the toes of boots and shoes. Ordinarily such tips are cut curved and formed sinuous, serrated, or scalloped along that edge of the tip which crosses the upper of the boot or shoe. Sometimes also the tip is ornamented by perforations. According to the present invention the cutting is effected obliquely to the surface of the leather or other material to be cut, and if the machine also punches the material this punching will be effected obliquely also.

In the drawings, which serve to illustrate the invention, Figure 1 is a vertical transverse mid-section of a cutting and punching machine embodying the invention; and Fig. 1ª is a sectional view of a part of the same, on a larger scale, illustrating the punches more clearly. Fig. 2 is a plan of the machine on the same scale as Fig. 1. Fig. 3 is a face view of the cutter detached. Fig. 4 is an end view of the same. Fig. 5 is a view of the cutter as seen from the direction indicated by the arrow $x^5$ in Fig. 4. Fig. 6 is a rear view of the cutter as seen from the direction indicated by the arrow $x^6$ in Fig. 7, and Fig. 7 is a transverse mid-section of the same. Figs. 8 and 9 are respectively a plan and cross-section similar to Figs. 5 and 7, showing an angular serrated cutter. Fig. 10 includes a plan view and a cross-section of a leather tip cut and punched by the machine, the cutter of Figs. 3 to 7 being used. Fig. 11 is a sectional view, enlarged, showing a way of setting the punches; and Fig. 12 is a view illustrating the operation of the edge-cutters. Figs. 13 and 14 are views similar to Fig. 5, showing edge-cutters of different forms. Fig. 15 is a view similar to Fig. 1, illustrating a construction of the machine wherein the bed moves obliquely to the cutter.

It is not important, of course, that the machine which operates the cutter and the punches shall be constructed precisely as shown in Figs. 1 and 2; but this construction is simple and effective.

1 is the base, upon which is mounted a frame 2, having in it oblique guides at 3 to receive the carriage 4 for the edge-cutter 5 and the punches 6. The carriage 4 is coupled by a link 7 to an arm 8 on a rocker 9, provided with an operating lever or handle 10. In a recess in the base 1 is a cutting bed or plate 11, of hard rubber or other suitable substance, for the leather or other material to rest on in cutting. This plate 11 is held in place by means of washers and screws 12, set in the base, and it may be shifted to bring under the cutter a fresh or uncut surface by moving or shifting it forward or back. Both faces of the plate 11 may be used, and it may be turned over when one face shall have become roughened by the cutter. A screw 13 serves to limit the movement of the edge-cutter 5, so that it shall cut through the leather or other material to be beveled, but not sink into the cutting-plate.

On the front part of the bed or base is slidably mounted a guide-plate 14, which has blocks 15 that play in guideways in the base and have screw-stops 16, which limit its movement toward the cutter 5.

In operating the machine the plate 14, which may be curved at its edge to correspond with the curvature of the tip to be cut, is drawn back, a tip is passed in under the cutter, and the plate 14 pushed in again. This plate serves to adjust the tips properly and uniformly to the edge-cutter. The operator now pulls over the handle 10 until it strikes the limiting-screw 13, thus driving the cutter 5 and punches 6 down obliquely through the tip.

Fig. 10 shows a leather tip T, cut and punched by the edge-cutter 5 and the punches 6, shaped and set, as shown; but obviously the edge-cutter may be so shaped as to produce other forms than the serrated margin shown in Fig. 10. Indeed it might produce only a plain curved beveled edge. The particular pattern cut by the edge-cutter is not important.

In order that the cutter 5 may produce a bevel on the edge of the leather or material and may bevel the same along a curved line, it is necessary to give to the cutter the peculiar form illustrated herein—that is to say, its cutting-face $a$, measured at a right angle to the width of the cutter, will be broad enough to include all the curvatures, scallops, indentations, zigzags, &c., of the cutting edge, and this latter will be made up of connected but non-alined elements. This broad cutting-face will be a plane and be always parallel to the cutting-surface or the surface of the article to be beveled, and of course oblique to the line of the cutting movement. The front face $b$ and rear face $c$ of the cutter will both make angles of less than ninety degrees with the cutting-face $a$. Preferably the rear face $c$ will be slightly oblique to the line of movement in cutting, so that it will not bear on the beveled surface cut. With this construction and form when the cutter descends obliquely on the material the broad cutting-face $a$ comes first to rest fairly on the surface of the material at all points and then passes down obliquely through it, all points in the cutting face or edge $a$ reaching the cutting-plate simultaneously. The rear face $c$ of the cutter being slightly oblique to the path along which the cutter moves does not press on and crowd or wedge back the tip, but the front face $b$ has a slight wedging-angle. This form of cutter will make a smooth uniform beveled cut, whatever may be its ornamental contour—that is, whether the contour be serrated, scalloped, or of any sinuous form.

Figs. 1 and 1$^a$ show the form of the cutting-punches 6. The axis of the punch is parallel with the path in which it moves, and the cutting-face is always parallel with the cutting-surface of the plate 11. The bevel of the punch will be exterior and most acute at the front, that at the rear being kept about parallel with the path in which the punch moves, or if the punches be set, as indicated in Fig. 11, with the axis of the bore of the punch oblique to the path in which the punch moves, the back bevel may be conveniently made to clear the beveled surface of the cut, as in the case of the back of the edge-cutter 5. In this view the dotted line indicates the path in which the punch moves. $a^\times$ is the cutting-face, $b^\times$ is the front face, and $c^\times$ is the rear face.

Fig. 12 illustrates, diagrammatically, the operation of the edge-cutter.

The cutter shown in Figs. 3 to 7 is curved in its width, as seen in Fig. 5, and the curve is made up of zigzags or serrations; but that seen in Figs. 8 and 9 is formed of two straight series of serrations meeting at an obtuse angle.

When it is not desired to punch the tip or not desired to punch it simultaneously with the cutting of its edge, the punches may be omitted. Indeed the punching may be effected by the ordinary means and the tips be beveled with an edge-cutter constructed as described.

Obviously the punch herein used is a cutter, and both punch and cutter operate on similar principles. Hence they may both be considered as cutters with plane cutting-faces relatively broad, so as to include all curves, angles, serrations, and sinuosities of the cutting edges, and such surfaces situated parallel to the cutting-surface when in the machine and oblique to the path of the cutting movement.

The word "width" as herein applied to the cutter is intended to mean the horizontal measurement across it from one extremity of the cutting edge to the other.

In the construction illustrated in Fig. 15 the cutter 5 is fixed to a rigid head 17 on the fixed base 18, and in the fixed base 18 is mounted to move up and down in oblique guides 19 a bed 20, which carries the cutting-plate 11. Below the bed is mounted rotatively in the base a rock-shaft 21, which has an arm 22 coupled by a link 23 to lugs on the movable bed 20, and on this shaft is an arm 24, to which is coupled a treadle-rod 25, whereby the bed may be driven obliquely upward in cutting a bevel. A spring 26 serves to retract the bed.

Obviously the form of cutter described, including also the punches, which cut on the same principle, may be employed for cutting and ornamenting other parts of a shoe than the tip. In fitting a shoe, for example, it is desirable sometimes to ornament the upper portion where it overlaps the vamp, and this may be done as well by the form of cutter herein described.

Having thus described my invention, I claim—

1. Means for cutting a bevel, comprising a cutter, a cutting-bed, and means for bringing said cutter and bed together for cutting, the movement being in a direction oblique to the surface of the cutting-bed, said cutter having a broad, plane cutting-face extending widthwise of the cutter, said cutting-face being composed of a cutting edge lying in a plane which is parallel with the surface of the said cutting-bed and which is also oblique to the path of the cutting movement, in combination substantially as set forth.

2. Means for cutting a bevel, comprising a cutter, a cutting-bed, guides for the cutter, and means for moving the cutter in said guides toward and from the surface of the cutting-bed in a direction oblique thereto, said cutter having a broad, plane cutting-face $a$, extending widthwise of the cutter, said cutting-face being composed of a cutting edge lying in a plane which is parallel with the surface of the said cutting-bed and which is also oblique to the path of the cutting movement, and the back face of the cutter being at an angle with the surface of the cutting-bed greater than the angle made therewith by the path of the cutter, in combination substantially as set forth.

3. Means for cutting a bevel, comprising a cutter, a cutting-bed, and means for bringing the said cutter and bed together for cutting, the movement being in a direction oblique to the surface of the cutting-bed, said cutter having a broad, plane, cutting-face extending widthwise of the cutter, said cutting-face being composed of a continuous cutting edge the elements of which are out of alinement with each other and lying wholly in a plane which is parallel with the surface of the said cutting-bed and which is also oblique to the path of the cutting movement, in combination substantially as set forth.

4. Means for cutting beveled margins of tips, comprising a cutter, a cutting-bed, and means for bringing said cutter and bed together for cutting, the movement being in a direction oblique to the surface of the cutting-bed, said cutter having a broad, plane cutting-face extending widthwise of the cutter, said cutting-face being composed of a continuous, curved and sinuous cutting edge lying wholly in a plane which is parallel with the surface of the said cutting-bed and which is also oblique to the cutting movement, in combination substantially as set forth.

5. A cutter for cutting bevels having a broad, plane, cutting-face $a$, extending widthwise of the cutter and composed of a continuous cutting edge lying wholly in a plane which is oblique to both the front face $b$ and rear face $c$ of the cutter, whereby the face $a$ of the cutter may be maintained during the cutting movement in a plane parallel with the surface of the material to be beveled, substantially as set forth.

6. The combination with a cutting-bed or plate and a frame, of a carriage mounted in said frame and adapted to move toward and from said bed in a path oblique to the surface thereof, a curved cutter mounted in said carriage and having a sinuous edge, and a series of cuting-punches also mounted in said carriage, said cutter and punches having their cutting-faces parallel to the surface of the cutting-bed.

In witness whereof I have hereunto signed my name this 6th day of February, 1900, in the presence of two subscribing witnesses.

EDWIN B. STIMPSON.

Witnesses:
   HENRY CONNETT,
   PETER A. ROSS.